United States Patent
Ou et al.

(10) Patent No.: US 11,409,562 B2
(45) Date of Patent: Aug. 9, 2022

(54) CLASS-BASED DYNAMIC MEMORY SLOT ALLOCATION

(71) Applicant: Micron Technology, Inc., Boise, ID (US)

(72) Inventors: Michael Ou, Newark, CA (US); Hao Liu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 426 days.

(21) Appl. No.: 16/487,392

(22) PCT Filed: Sep. 13, 2018

(86) PCT No.: PCT/CN2018/105509
§ 371 (c)(1),
(2) Date: Aug. 20, 2019

(87) PCT Pub. No.: WO2020/051839
PCT Pub. Date: Mar. 19, 2020

(65) Prior Publication Data
US 2021/0334141 A1    Oct. 28, 2021

(51) Int. Cl.
*G06F 9/46*      (2006.01)
*G06F 9/50*      (2006.01)
(Continued)

(52) U.S. Cl.
CPC .......... *G06F 9/5016* (2013.01); *G06F 9/5022* (2013.01); *G06F 13/1668* (2013.01);
(Continued)

(58) Field of Classification Search
CPC .. G06F 9/5016; G06F 9/5022; G06F 13/1668; G06F 13/18; G06F 2009/5022; G06F 2009/508
See application file for complete search history.

(56) References Cited

U.S. PATENT DOCUMENTS 6,687,254 B1 *    2/2004    Ho .......................... H04L 47/24
                                                                                                    370/230
2004/0049650 A1    3/2004    Ling et al.
(Continued)

FOREIGN PATENT DOCUMENTS

| CN | 1855881 A | 11/2006 |
|---|---|---|
| CN | 112889036 | 6/2021 |
| WO | 2020051839 | 3/2020 |

OTHER PUBLICATIONS

"International Application Serial No. PCT/CN2018/105509, International Search Report dated May 31, 2019", 4 pgs.
(Continued)

*Primary Examiner* — Diem K Cao
(74) *Attorney, Agent, or Firm* — Schwegman Lundberg & Woessner, P.A.

(57) ABSTRACT

A memory slot allocation request specifying a requested number of memory slots is received from a requestor assigned to a particular class among a plurality of classes. It is determined whether allocation of the requested number of memory slots to the requestor results in satisfaction of resource allocation constraints for the plurality of classes. The resource allocation constraints include a first and second threshold for each class that determine how many memory slots can be allocated to each class. Based on determining that allocation of the requested number of memory slots to the requestor results in satisfaction of the resource allocation constraints, the memory slot allocation request is granted. The granting of the memory slot allocation request includes allocating the requested number of memory slots to the requestor.

20 Claims, 6 Drawing Sheets

(51) Int. Cl.
G06F 13/16 (2006.01)
G06F 13/18 (2006.01)
(52) U.S. Cl.
CPC ........ G06F 13/18 (2013.01); *G06F 2209/508* (2013.01); *G06F 2209/5022* (2013.01)

(56) References Cited

U.S. PATENT DOCUMENTS

| | | |
|---|---|---|
| 2005/0010738 A1 | 1/2005 | Stockdale et al. |
| 2009/0125700 A1* | 5/2009 | Kisel ................ G06F 12/08 711/173 |
| 2012/0331475 A1 | 12/2012 | Ostrovsky et al. |
| 2017/0068465 A1* | 3/2017 | Schreter ............ G06F 16/22 |

OTHER PUBLICATIONS

"International Application Serial No. PCT/CN2018/105509, Written Opinion dated May 31, 2019", 4 pgs.
"International Application Serial No. PCT CN2018 105509, International Preliminary Report on Patentability dated Mar. 25, 2021", 6 pgs.

* cited by examiner

CLASS-BASED DYNAMIC MEMORY SLOT ALLOCATION

PRIORITY APPLICATION

This application is a U.S. National Stage Application under 35 U.S.C. 371 from International Application No. PCT/CN2018/105509, filed Sep. 13, 2018, which is incorporated herein by reference in its entirety.

TECHNICAL FIELD

Embodiments of the disclosure relate generally to memory sub-systems and, more specifically, to class-based dynamic memory slot allocation in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to class-based dynamic memory slot allocation in a memory sub-system. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

In many instances, the memory components of a memory sub-system are shared by multiple requestors. The shared memory components are often partitioned into multiple units, which are allocated to a given requestor for its own particular use. For example, in a given memory component, small pieces of the memory blocks can be allocated for use by a given requestor, and only that requestor is allowed to write to or update that block.

Different schemes have been devised to manage the allocation and deallocation of the usable resources within such memory sub-systems. In many conventional schemes, firmware completely manages how all memory is allocated. Having firmware completely manage memory provides flexibility, but usually entails high central processing unit (CPU) overhead and resulting performance loss. In other conventional schemes, hardware handles the resource allocation to offload firmware.

For hardware resource allocation, many conventional schemes use a bit map to track which memory resources are in use and which are available. In these register bit map implementations, a register bit is set to mark when a resource is in use. One typical algorithm is a "find first zero" method, which scans through the register bit map and then returns the first unset register, which means that particular resource is not allocated. An identifier is mapped to that register bit, and that identifier is used by the requestor to track usage of the resource. For memory allocation, the identifier is used as an index to a memory region to access. Since the requestor is assigned a unique identifier for that memory slot, other requestors will not overwrite that memory region.

When multiple independent requestors are all trying to obtain memory resources, they are often greedy in nature and will attempt to get as much as possible. If left unchecked, a greedy requestor may end up allocating all of the memory resources towards itself to the detriment of other requestors. This situation may end up severely hampering performance or locking up the system. Conventional solutions to manage this situation include having high level system firmware manage this directly by monitoring all resource activity, which results in additional firmware overhead. Another solution is statically partitioning all available resources across the different requestors; this prevents a greedy requestor from hogging all resources as they only have a fixed limit. Static partitioning, however, can limit performance since it does not allow any type of dynamic on-the-fly adjustments to resource allocation for situations when a particular greedy client may actually need more resources, with the other lower priority clients able to manage with less resources.

Aspects of the present disclosure address the above and other deficiencies by having a memory sub-system that allows for memory resources to be partitioned across a configurable number of "classes." Each "class" is used to define resource allocation constraints for a given requestor. The resource allocation constraints for a given class include a minimum number of memory resources guaranteed for a requestor in the class, and a maximum number of memory resources that the requestor can obtain. The minimum number of resources for a class is based on a programmable minimum threshold setting and the maximum number of resources for the class is based on a programmable maximum threshold setting. As used herein, the term "memory slots" refers to common units of memory allocation that are a fixed size. The term "class requestor" refers to the requestor asking for resources within a given defined class.

The minimum threshold setting for a given class indicates a minimum threshold that defines the minimum number of memory slots that are guaranteed to be available for allocation for a class requestor. This ensures a minimum resource allocation for that class requestor so that it can always have at least some memory slots available for its operation to progress. This number can be set as low as '0', meaning that in the worst-case scenario, there will be no memory slots available for a given class requester. The maximum threshold setting indicates a maximum threshold that defines the maximum number of memory slots a class requestor may be allocated. This limits the number of memory slots a given class requestor can obtain, thereby preventing that class requestor from hogging all the memory resources. It is possible for the maximum thresholds across all class requestors to be greater than the total available memory slots. The maximum threshold represents the number of memory slots that a class requestor may need, but at any given time the class requestor may have less than the maximum threshold depending on what memory slots are currently allocated to other requestors.

A constraint manager of the memory sub-system can assign different system functions to one of multiple classes to configure a resource allocation size range (e.g., defined by a minimum and maximum threshold setting) for each system function. Each of these functions can be run on a single processor or act as part of a workload for a given processor. Each function can request some number of memory slot allocations to complete the particular tasks for which it is responsible.

A slot allocation manager monitors resource allocation requests and manages the different classes and the threshold values that define resource allocation size ranges. The hardware slot allocation manager takes as input all of the different class minimum and maximum threshold settings, a total number of memory resources used, and a total number of memory resources available. The slot allocation manager can pre-allocate one or more memory slots to be granted to a given class requestor upon making a resource allocation request. The slot allocation manager decides whether to grant the pre-allocated memory slots to the class requestor based on the minimum and maximum threshold settings for all classes along with the total number of memory resources available. If there are enough remaining memory slots to satisfy the request and the minimum thresholds for the remaining classes, the hardware slot allocation manager grants the pre-allocated memory slots to the class requestor in response to the request and then pre-allocates further memory slots. If there are not enough remaining memory slots to satisfy the request and the minimum thresholds for the remaining classes, or if more than the maximum threshold number of memory slots are requested, the hardware slot allocation manager denies the resource allocation request.

The minimum and maximum threshold values can be dynamically changed on the fly. For example, if the constraint manager detects a situation where a given class may need more memory resources than the current threshold settings allow, the constraint manager can update any one of the minimum or maximum thresholds to accommodate this need. The updated threshold values are immediately visible to the slot allocation manager, which responds accordingly.

It shall be appreciated that the memory sub-system described above provides an advantage over a conventional memory sub-system in that it allows hardware more flexibility to dynamically optimize the memory resource allocation and improves system throughput versus a scheme of static fixed allocation of resources. Typically, when a function (e.g., a system write) is requiring more performance, it will naturally demand more resources over functions which are not as active (e.g., a lower priority system garbage collection task). For example, if a large number of writes floods the memory sub-system, both front-end host write and back-end write functions will demand more memory slot resources to service the write requests. In a static allocation where each function only has a fixed number of total memory slots, this may limit write performance. However, with the dynamic class-based allocation system described herein, when a larger number of writes come into the system, additional memory slots can be allocated for the front-end host write traffic and additional memory slots can be allocated for the hack-end write traffic.

Figure 1:
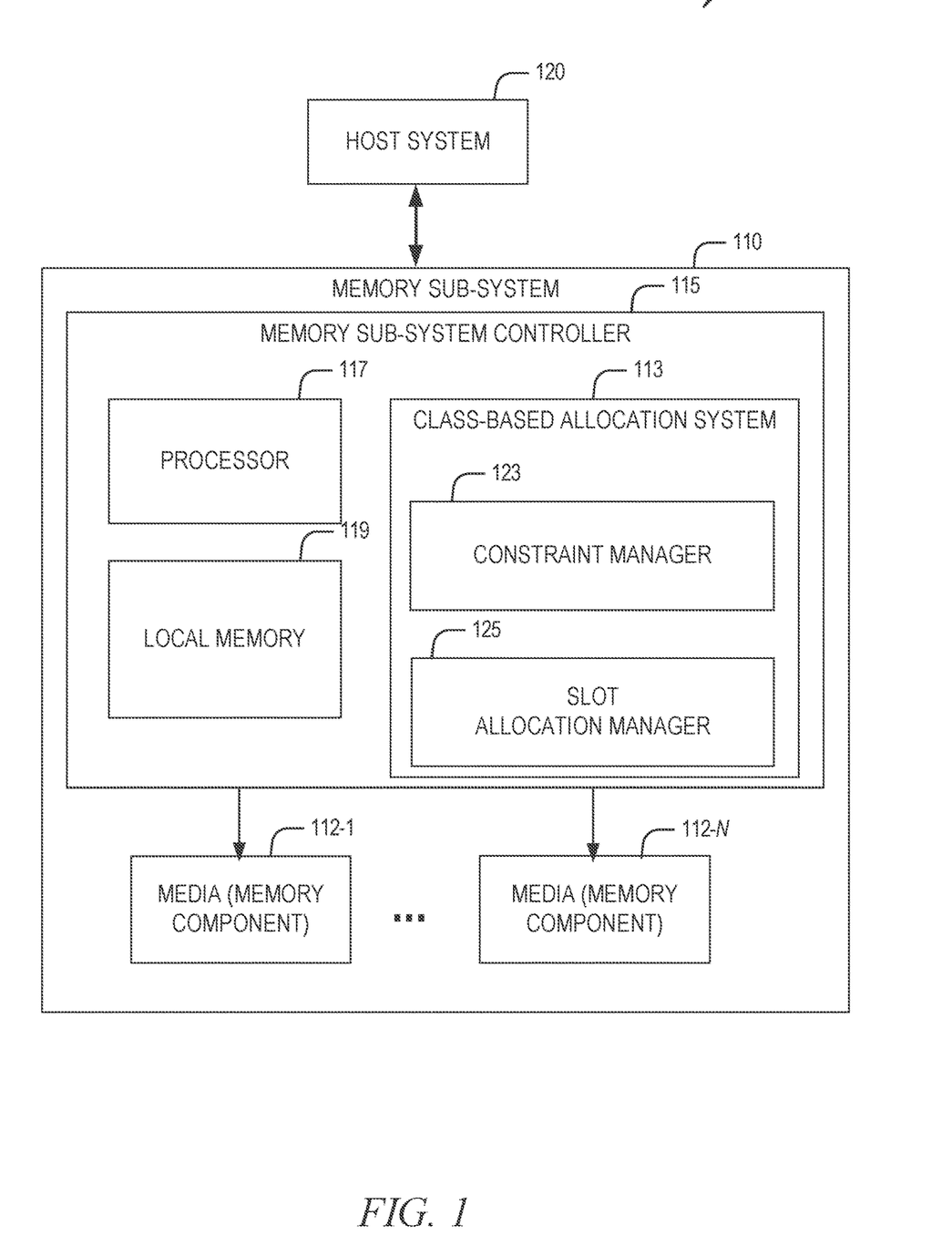
FIG. 1 illustrates an example computing environment that includes a memory sub-system, in accordance with some embodiments of the present disclosure.

FIG. 1 illustrates an example computing environment 100 that includes a memory sub-system 110, in accordance with some embodiments of the present disclosure. The memory sub-system 110 can include media, such as memory components 112-1 to 112-N. The memory components 112-1 to 112-N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, and the like. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), and so forth. The physical host interface can be used to transmit data between the host system 120 and the memory sub-system 110. The host system 120 can further utilize a Non-Volatile Memory (NVM) Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative-and (NAND) type flash memory. Each of the memory components 112-1 to 112-N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, as noted above, the memory cells of the memory components 112-1 to 112-N can be grouped into memory slots that can refer to a common fixed sized unit of the memory component for allocation to a requestor and to be used to store data.

The memory sub-system controller 115 (hereinafter referred to as "controller") can communicate with the memory components 112-1 to 112-N to perform operations such as reading data, writing data, or erasing data at the memory components 1124 to 112-N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and the like. The local memory 119 can also include ROM for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system into command instructions to access the memory components 112-1 to 112-N as well as convert responses associated with the memory components 112-1 to 112-N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112-1 to 112-N.

The memory sub-system 110 includes a class-based allocation system 113 that is responsible for allocating memory resources from the memory components 112-1 to 112-N to requestors. In some embodiments, the controller 115 includes at least a portion of the class-based allocation system 113. For example, the controller 115 can include a processor 117 (processing device) configured to execute instructions stored in local memory 119 for performing the operations described herein. In some embodiments, the class-based allocation system 113 is part of the host system 120, an application, or an operating system.

The class-based allocation system 113 partitions the memory resources of the memory components 112-1 to 112-N across a parameterizable number of classes. A constraint manager 123 defines allocation constraints for each class that constrain the number of memory slots that can be allocated to each class. For each class, the constraint manager 123 defines a minimum and maximum threshold setting. The minimum threshold setting defines a minimum number of memory slots that are made available for allocation to a given class, and the maximum threshold setting defines a maximum number of memory slots that may be allocated to the class. In some instances, the constraint manager 123 dynamically adjusts the allocation constraints to account for changes in system configuration (e.g., a memory component being added or removed), operation mode, allocation request traffic patterns, or other such considerations.

A slot allocation manager 125 receives memory slot allocation requests from requestors and determines whether to grant the requests based on the allocation constraints. The slot allocation manager 125 may provide a request interface to requestors through which the requestors may submit memory resource requests and receive an indication of whether the request has been granted or denied based on the allocation constraints. To improve throughput, the slot allocation manager 125 may pre-allocate one or more memory slots for each class, and in granting a memory slot allocation request for a given class requestor, the slot allocation manager 125 can grant the pre-allocated memory slots to the class requestor as well as additional memory slots, if needed to satisfy the request. Further details with regards to the operations of the class-based allocation system 113 are described below.

Figure 2:
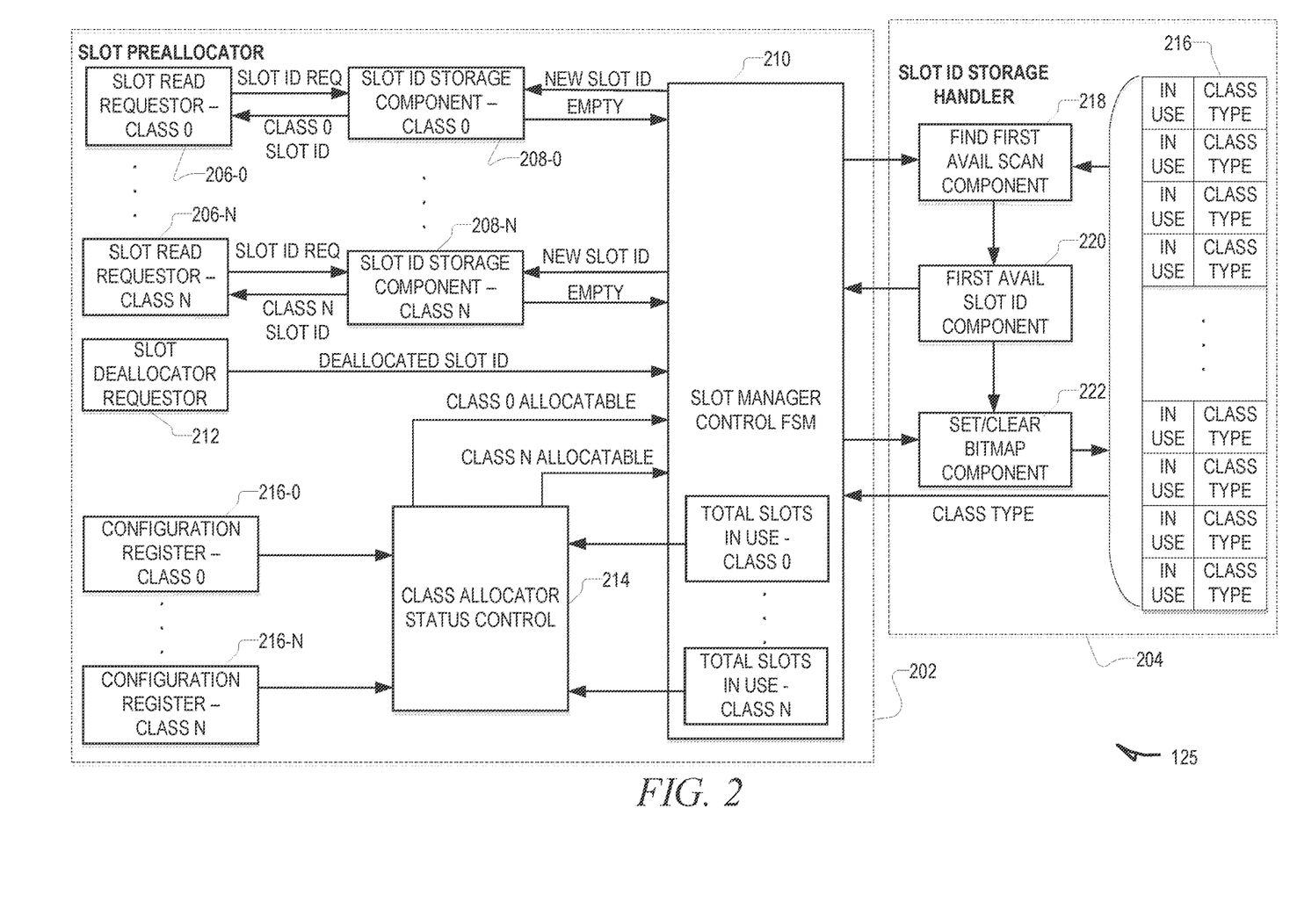
FIG. 2 is a block diagram illustrating components of a slot allocation manager, in accordance with some embodiments of the present disclosure.

FIG. 2 is a block diagram illustrating components of the slot allocation manager 125, in accordance with some embodiments of the present disclosure. As shown, the slot allocation manager 125 comprises a slot pre-allocator 202 and a slot identifier (ID) handler 204. The slot pre-allocator 202 includes slot read requestors 206-0 to 206-N and pre-allocated slot ID storage components 208-0 to 208-N. Each of the slot read requestors 206-0 to 206-N read requests for a particular class slot. Each of the slot read requestors 206-0 to 206-N include memory mapped registers that are readable by the CPUs of the system. A read to the register by a requesting CPU maps to a particular class slot read request. The read request issued returns one or more valid pre-allocated slot IDs from a corresponding one of the pre-allocated class slot ID storage components 208-0 to 208-N.

The pre-allocated class slot ID storage components 208-0 to 208-N store the IDs of the pre-allocated slots for each Class (Class 0 to Class N). Each of the pre-allocated class slot ID storage components 208-0 to 208-N comprise flip flops to store the slot IDs along with a valid bit to indicate if the slot IDs stored are valid. Two or more pre-allocated slots may be stored per class. As valid slots are returned to the slot read requestors 206-0 to 206-N, the valid bits are cleared.

Each of the pre-allocated class slot ID storage components 208-0 to 208-N use an "empty" signal that is passed onto a slot manager finite state machine (FSM) 210. The empty signal indicates that there are no more valid slots available (e.g., because they have been read out by one of the slot read requestors 206-0 to 206-N), which signals the slot manager FSM 210 to allocate more class slots, if possible. As new slots are pre-allocated, they are sent as "New Slot IDs" and stored within one of the pre-allocated class slot ID storage components 208-0 to 208-N.

The slot pre-allocator 202 also includes a slot deallocator requestor 212 responsible for making slot deallocation requests to the slot manager FSM 210. The deallocator requester 212 issues the ID of a slot to be deallocated by the slot manager FSM 210. These deallocated slots are released back into the pool of available slots.

The slot manager FSM 210 manages the pre-allocation of slots back to the pre-allocated class slot ID storage components 208-0 to 208-N. The slot manager FSM 210 provides an interface to the slot ID handler 204 and manages both pre-allocation and de-allocation. The slot manager FSM 210 receives input from a class allocator status control 214 to determine whether slots for a particular class can be pre-allocated or if the maximum limit has been reached.

The slot manager FSM 210 includes counters to track how many slots of each class have been allocated. These counters are used by the class allocator status control 214 to determine whether additional class slots should be pre-allocated.

The slot allocation manager 125 also comprises configuration registers 214-0 to 214-N. The configuration registers 214-0 to 214-N store the allocation constraints for each class. That is, each of the configuration registers 214-0 to 214-N stores a minimum threshold setting and a maximum threshold setting for a single class. The class allocator status control 214 uses the allocation constraints to determine if class slots can be pre-allocated or if the maximum threshold has been reached.

The class allocator status control 214 receives the allocations constraints for each class as input along with the current count of allocated slots per class. The class allocator status control 214 uses this information to determine if the slot manager FSM 210 can pre-allocate slots for a particular class. Based on a result of this determination, the class allocator status control 214 provides a "Class Allocatable" signal to the slot manager FSM 210 that indicates whether the slot pre-allocator 202 can pre-allocate more slots for the particular class or if the maximum threshold has been reached.

The slot ID handler 204 manages a register bit map 216 to track which memory resources are in use and which are available. The slot ID handler 204 comprises a find first available scan component 218, a first available slot ID component 220, and a set/clear bit map component 222. The register bit map 216 tracks and stores all available slot IDs. One register bit is assigned per slot ID. There is an 'In-Use" bit that indicates whether the slot is used. The register bit map 216 includes a class-type register for every bit that is used to indicate to which class that particular slot is assigned. The class-type register tracks how many total slots are assigned per class.

The find first available scan component 218 scans the register bit map 216 to find the first available slot to be allocated. The first available slot allocated is identified by a first zero "In-Use" bit field in the register bit map 216.

The first available slot ID component 220 stores the first available slot ID returned from the find first available scan component 218 and provides the available slot ID to the slot manager FSM 210 as the next free slot to be pre-allocated.

The set/clear bit map component 222 updates the register bit map 216. The set/clear bit map component 222 sets the "In-Use" bit and updates the class-type for allocated slots. The set/clear bit map component 222 also identifies and clears the "In-Use" bit for slots which are to be deallocated.

Figure 3:
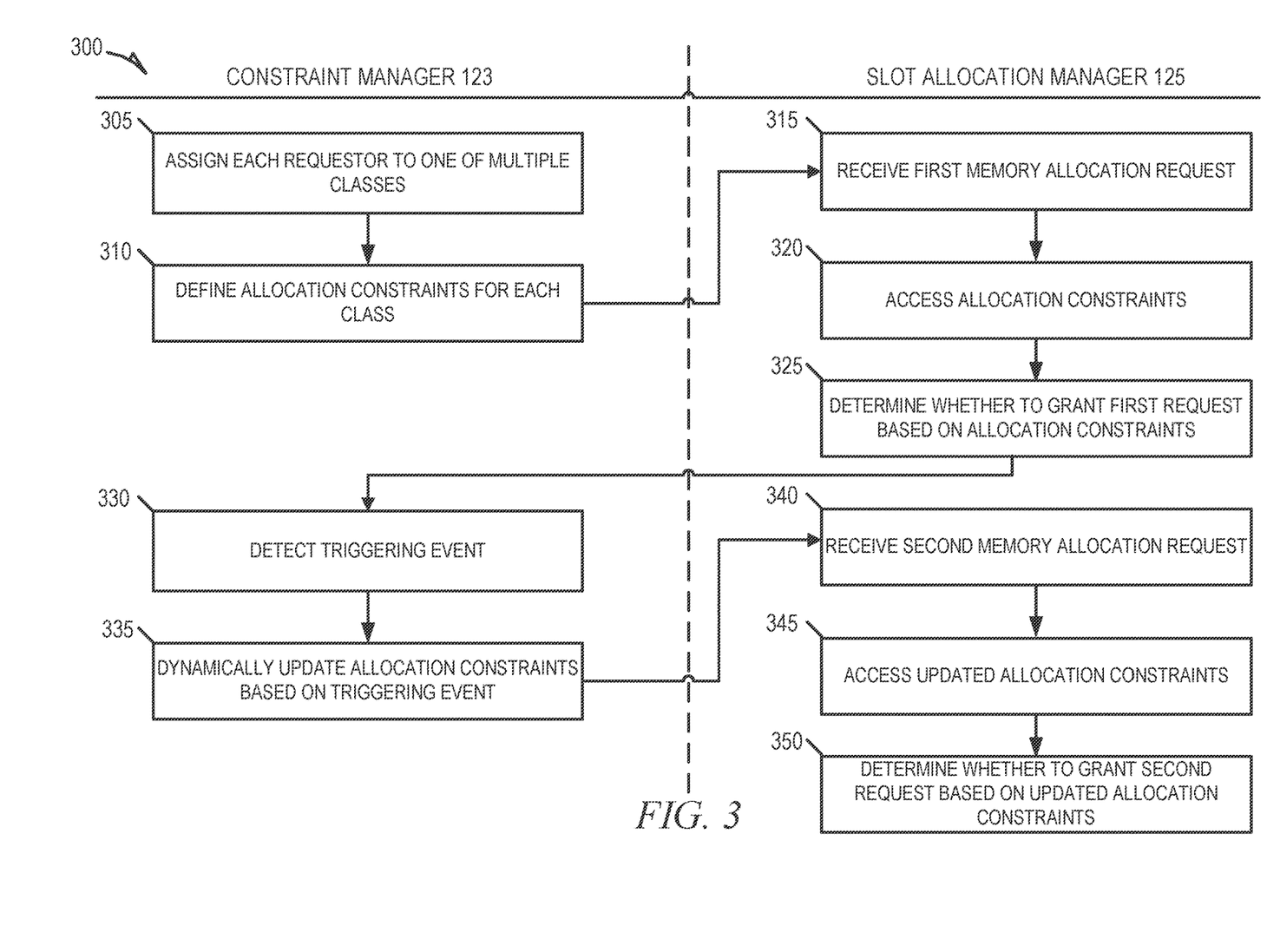
FIG. 3 is an interaction diagram illustrating interactions between the components of the class-based allocation system in performing a method to allocate memory resources in accordance with dynamically updated class-based allocation constraints, in accordance with some embodiments of the present disclosure.

FIG. 3 is an interaction diagram illustrating interactions between the constraint manager 123 and the slot allocation manager 125 in performing a method 300 to allocate memory resources in accordance with dynamically updated class-based allocation constraints, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the operations of the method 300 shown as being performed by the constraint manager 123 may be performed by firmware (e.g., executed by the processor 117) and the operations of the method 300 shown as being performed by the slot allocation manager 125 may be performed by hardware. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In the context of method 300, multiple requestors may submit resources allocation requests to the class-based allocation system 113. Each requestor may correspond to a component or process of the memory sub-system 110 or host system 120. At operation 305, the constraint manager 123 assigns each requestor to one of multiple classes. The constraint manager 123 may assign a given requestor to a particular class based, for example, on a function or type of the requestor or an external input.

As an example, in some implementations, the memory sub-system controller 115 may be an SSD controller that utilizes multiple processor functions to manage the data flow. In this example, each processor function may need memory resources for the following functions: front-end write data traffic; front-end read data traffic; back-end write data traffic; back-end read data traffic; and system garbage collection. Each of these functions may be run on a single processor or act as part of a workload for a given processor, but each function requires some number of memory slot allocations. The constraint manager 123 can assign each of these functions to a different class as follows: front-end write data traffic is assigned to "class 1," front-end read data traffic is assigned to "class 2," back-end write data traffic is assigned to "class 3," back-end read data traffic is assigned to "class 4," and system garbage collection is assigned to "class 5."

At operation 310, the constraint manager 123 defines allocation constraints for each class. That is, the constraint manager 123 defines a minimum and a maximum threshold setting for each class. The constraint manager 123 may define the minimum and maximum threshold settings for each class based, for example, on a default setting, an external input, a resource request traffic profile, an operation mode (e.g., an operation mode of the host system 120 or memory sub-system 110), or learned behavior of the requestors determined based on monitoring requests received from the requestors. The constraint manager 123 may configure the configuration registers to represent the allocation constraints defined for each class.

Following the example from above, the memory resources of the memory components 112A-112N may be partitioned into 1000 memory slots to be shared by the 5 class requestors. Accordingly, the constraint manager 123 may define: a maximum of 350 slots and a minimum of 50 slots for class 1; a maximum of 400 slots and a minimum of 50 slots for class 2; a maximum of 350 slots and a minimum of 50 slots for class 3; a maximum of 400 slots and a minimum of 50 slots for class 4; and a maximum of 200 slots and a minimum of 50 slots for class 5.

Based on the above example allocation constraints, front-end host write traffic can consume up to 350 of the 1000 slots at most but no more. This sets an upper limit so that the front-end host traffic is unable to consume all 1000 slots and prevents any other functions from running due to lack of available resources. The back-end flash write traffic could consume up to 350 slots total as well. This means write operations across the front-end and back-end sections might consume a total of 700 slots. The minimum number of slots of 50 per function allocated guarantees each function always has some resources available and will always be able to make progress. In this example, if 700 slots are initially consumed by the write traffic, there are 300 remaining slots left for the remaining read traffic for host and back-end reads, as well as system garbage collection. The minimum threshold setting of 50 slots guarantees that those functions will always have at least some slots to make progress. If a write function had been allocated all 700 slots, and a read operation was starting, even though the read might try to request up to 700 slots as well across front-end and back-end requests, it would only have 300 available left to work with. However, since the system garbage collection has a minimum of 50 slots, the garbage collection function would have 50 slots reserved for it, which means the system reads across front and back-end requestors could only be allocated up to 250 of the remaining 300 slots.

At operation 315, the slot allocation manager 125 receives a first memory slot allocation request from one of the multiple requestors. The first memory slot allocation request specifies a first number of requested memory slots. At operation 320, the slot allocation manager 125 accesses the allocation constraints (e.g., from a corresponding one of the configuration registers 216-0 to 216-N). At operation 325, the slot allocation manager 125 determines whether to grant the slot allocation request to the requester based on the allocation constraints. In particular, the slot allocation manager 125 determines whether to grant the slot allocation request based on a remaining number of available resources and whether allocation of the first number of requested memory slots satisfies the allocation constraints.

At operation 330, the constraint manager 123 detects a triggering event that gives rise to a need to change one or more memory allocation constraints. The triggering event may include a change to request traffic, a change to operation mode (e.g., operation mode of the host system 120 or memory sub-system 115), a change to system configuration, or an external input (e.g., a user or system command). At operation 335, the constraint manager 123 dynamically updates one or more memory allocation constraints in response to detecting the triggering event. More specifically, the slot allocation manager 125 can increase or decrease one or more minimum or maximum threshold settings for one or more classes. The slot allocation manager 125 configures one or more of the configuration registers 216-0 to 216-N to reflect the updated allocation constraints.

Following the example above, the constraint manager 123 may detect an extremely large number of reads to be serviced. In response, the constraint manager 123 may increase the maximum thresholds for classes 2 (front-end host read traffic) and 4 (back-end flash read traffic) to 500 slots while decreasing the minimum thresholds to 0 for classes 1, 3, and 5. This would allow all memory slots to be made available to the read traffic (classes 2 and 4), though this may result in no memory slots being available to the write traffic (classes 1 and 3) and garbage collection (class 5) for some period of time.

At operation 340, the slot allocation manager 125 receives a second memory slot allocation request from one of the multiple requesters. The second memory slot allocation request specifies a second number of requested memory slots. At operation 345, the slot allocation manager 125 accesses the updated allocation constraints (e.g., from one of the configuration registers 216-0 to 216-N). At operation 350, the slot allocation manager 125 determines whether to grant the slot allocation request to the requestor based on the updated allocation constraints. In particular, the slot allocation manager 125 determines whether to grant the slot allocation request based on a remaining number of available resources and whether allocation of the second number of requested memory slots satisfies the updated allocation constraints.

Figure 4:
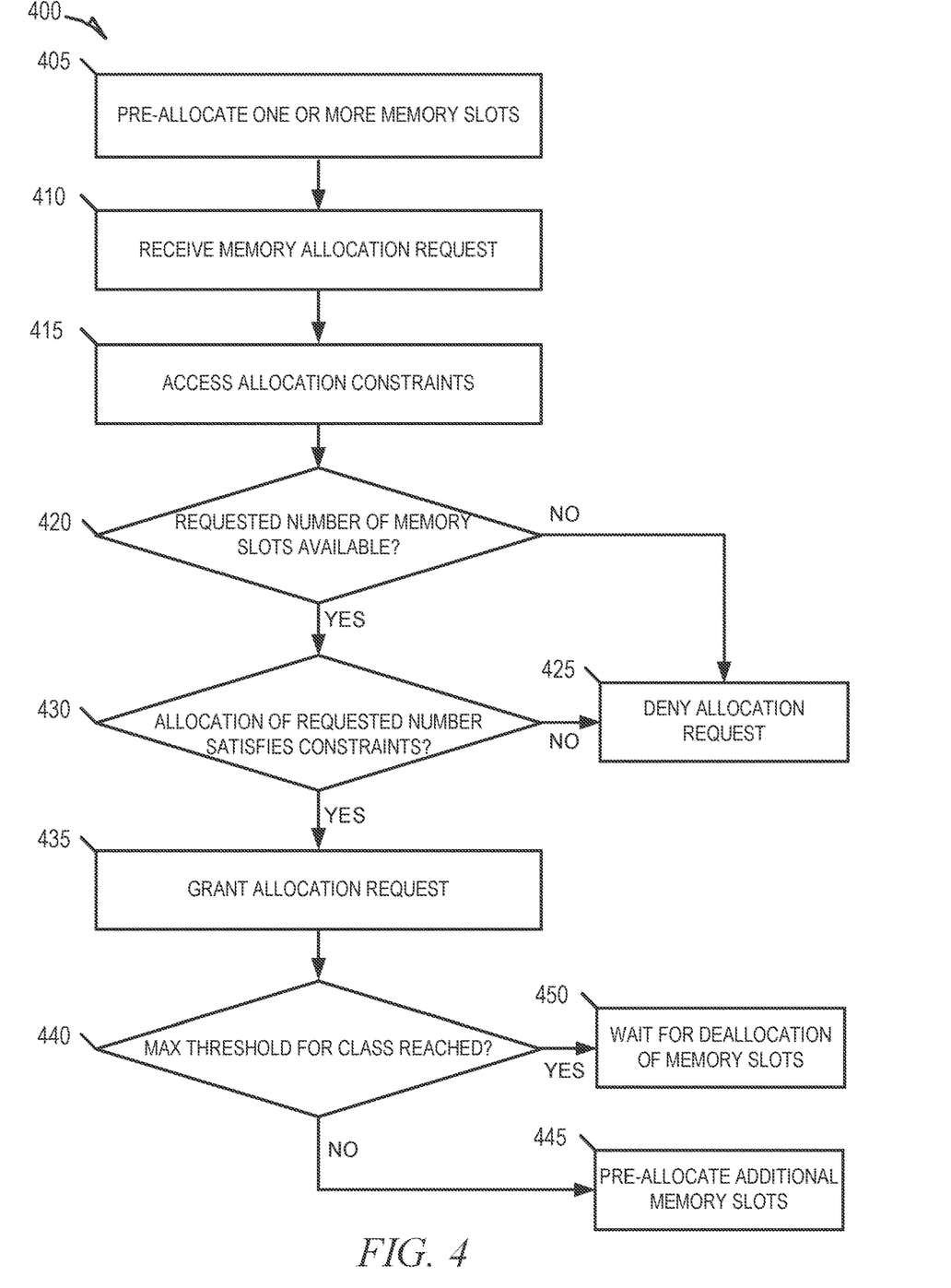
FIGS. 4 and 5 are flow diagrams of an example method to allocate memory resources in accordance with class-based allocation constraints, in accordance with some embodiments of the present disclosure.
Figure 5:
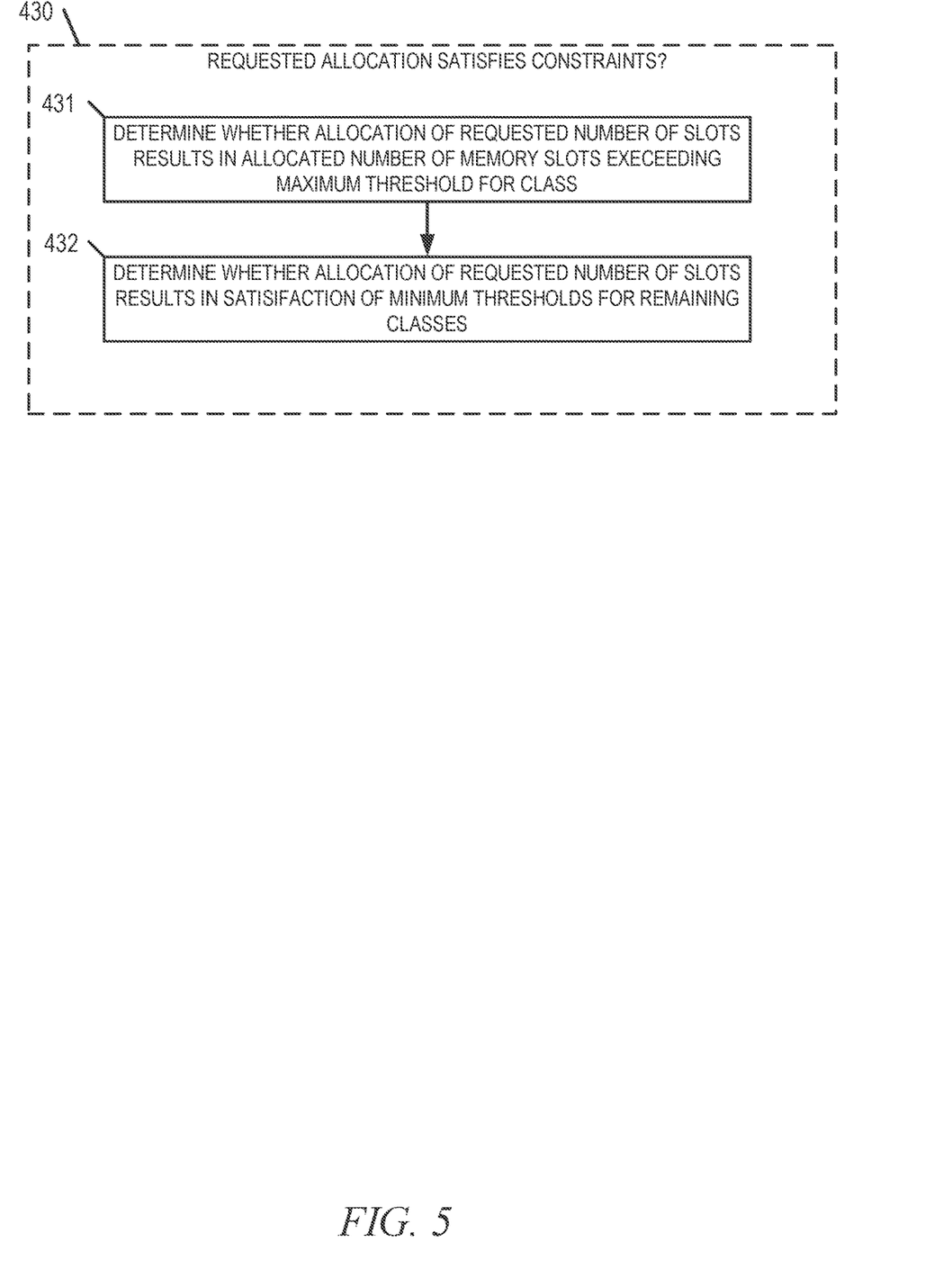

FIGS. 4 and 5 are flow diagrams of an example method 400 to allocate memory resources in accordance with class-based allocation constraints, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory class-based allocation system 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device pre-allocates (e.g., reserves) one or more memory slots for use by one of multiple classes. At operation 410, the processing device receives a memory slot allocation request from a requestor belonging to the class. The memory slot allocation request specifies a requested number of memory slots.

At operation 415, the processing device accesses current allocation constraints (e.g., from one of the configuration registers 216-0 to 216-N). The allocation constraints include a minimum and maximum threshold setting for each class that collectively dictate the number of memory slots that may be allocated to each class. More particularly, as noted above, for a given class, the minimum threshold setting defines a minimum number of memory slots that are to be kept available for allocation to the class, and the maximum threshold setting defines a maximum number of memory slots to be allocated to the class.

At operation 420, the processing device determines whether the requested number of memory slots are available (e.g., unallocated). If, at operation 420, the processing device determines there is an insufficient number of memory slots available to fulfil the request (e.g., the remaining number of available memory slots is less than the requested number of memory slots), then the processing device denies the memory slot allocation request, at operation 425. In these instances, the requester can continue to submit memory request allocation requests, which will be denied until further resources become available (e.g., because of deallocation of one or more memory slots).

If, at operation 420, the processing device determines there is a sufficient number of memory slots available to grant the requested number of memory slots (e.g., the remaining number of available memory slots is greater than or equal to the requested number of memory slots), the method 400 continues to operation 430 where the processing device determines whether allocation of the requested number of memory slots satisfies the allocation constraints. Further details regarding the determination of whether allocation of the requested number of memory slots satisfies the allocation constraints are discussed below with reference to FIG. 5.

If, at operation 430, the processing device determines that allocation of the requested number of memory slots would result in violation of one or more allocation constraints (e.g., allocation of the requested number of memory slots would result in the allocated number of memory slots exceeding the maximum threshold for the class), then the processing device denies the request, at operation 425.

On the other hand, if, at operation 430, the processing device determines that allocation of the requested number of memory slots would result in satisfaction of the allocation constraints, the processing device grants the memory allocation request, at operation 435. In granting the memory allocation request, the processing device grants the pre-allocated memory slots to the requestor. If the requested number of memory slots exceeds the number of pre-allocated memory slots, the processing device can allocate one or more additional memory slots to the request to fulfill the request.

At operation 440, the processing device determines whether the number of memory cells allocated to the class exceeds the maximum threshold for the class. If, at operation 440, the processing device determines the maximum threshold has not been reached (e.g., the number of memory cells allocated to the class does not exceed the maximum threshold for the class), the processing device pre-allocates one or more additional memory slots for the class at operation 445. If, at operation 440, the processing device determines the number of memory cells allocated to the class exceeds the maximum threshold for the class, the method 400 proceeds to operation 450 where the processing device waits for deallocation of memory slots from the class before pre-allocating additional memory cells for the class.

As shown in FIG. 5, the method 400 may, in some embodiments, include operations 431 and 432. Consistent with some embodiments, the operations 431 and 432 may be performed as part (e.g., subroutines) of operation 430 where the processing device determines whether allocation of the requested number of memory cells satisfies the allocation constraints.

At operation 431, the processing device determines whether allocation of the requested number of memory slots results in the number of memory slots allocated to the class exceeding the maximum threshold for the class. If the allocation of the requested number of memory slots results in the number of memory slots allocated to the class exceeding the maximum threshold for the class, then the maximum threshold constraint for the class is violated, and thus, allocation of the requested number of memory cells would not satisfy the allocation constraints. In these instances, as described above, the processing device denies the slot allocation request (operation 425).

On the other hand, if the allocation of the requested number of memory slots to the class does not cause the number of memory slots allocated to the class to exceed the maximum threshold for class, then at least the maximum threshold constraint for the class is satisfied.

At operation 432, the processing device determines whether allocation of the requested number of slots results in satisfaction of the minimum thresholds for all of the other classes. That is, the processing device determines whether the number of available memory slots remaining after allocating the requested number of memory slots is greater than or equal to a sum of minimum thresholds of all remaining classes. If allocation of the requested number of slots does not satisfy the minimum thresholds for all of the other classes (e.g., because the number of available memory slots remaining after allocating the requested number of slots is less than the sum of minimum thresholds of all remaining classes), the processing device determines that allocation of the requested number of slots does not satisfy the allocation constraints. As noted above, in these instances, the processing device denies the memory slot allocation request (operation 425).

On the other hand, if allocation of the requested number of slots does satisfy the minimum thresholds for all of the other classes (e.g., because the number of available memory slots remaining after allocating the requested number of slots is greater than or equal to the sum of minimum thresholds of all remaining classes), then the processing device determines that allocation of the requested number of slots satisfies the allocation constraints. As noted above, in these instances, the processing device grants the slot allocation request (operation 435).

Figure 6:
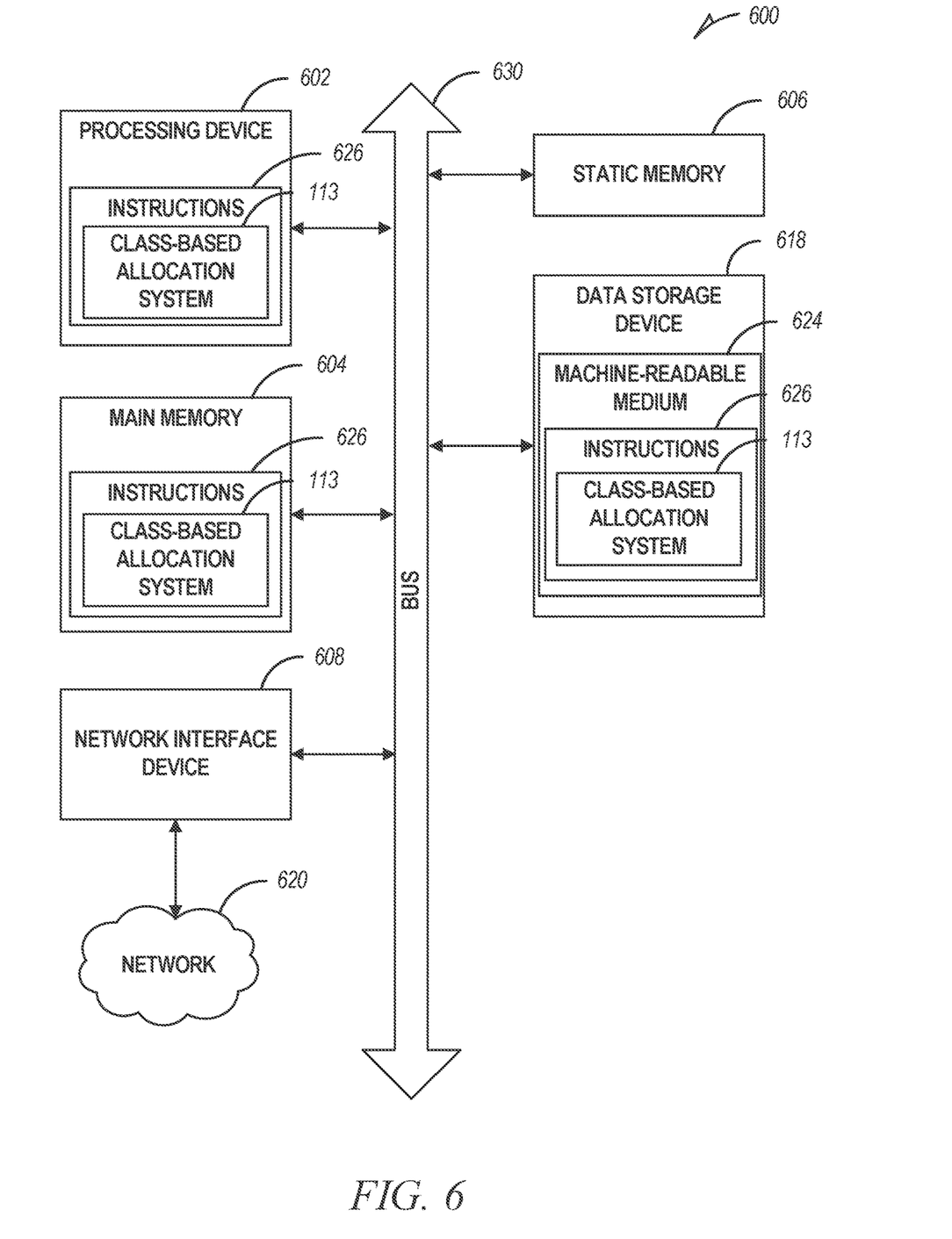
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the class-based allocation system 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory allocation system (e.g., the class-based allocation system 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

EXAMPLES

Example 1 is a system comprising: a plurality of memory components partitioned into memory slots; a configuration register to store resource allocation constraints for a plurality of classes, the resource allocation constraints including a first threshold and a second threshold for each class of the plurality of classes, each first threshold defining a minimum number of the memory slots to be made available for allocation to a class of the plurality of classes, each second threshold defining a maximum number of memory slots to be allocated to the class; and a processing device, operatively coupled with the plurality of memory components, to perform operations comprising: receiving, from a requestor assigned to a particular class, a memory slot allocation request, the memory slot allocation request specifying a requested number of memory slots for allocation to the requestor; determining that allocation of the requested number of memory slots to the requestor results in satisfaction of the resource allocation constraints for the plurality of classes; and granting the memory slot allocation request based on determining that allocation of the requested number of memory slots to the requestor results in satisfaction of the resource allocation constraints of the plurality of classes, the granting of the memory slot allocation request including allocating, from at least one memory component of the plurality of memory components, the requested number of memory slots to the requestor.

In Example 2, the processing device of Example 1 is optionally further to pre-allocate a memory slot for the particular class prior to receiving the memory slot allocation request; and the granting of the memory slot allocation request of Example 1 optionally comprises granting the pre-allocated memory slot to the requestor.

In Example 3, the granting of the memory slot allocation request of any one of Examples 1 and 2 optionally further comprises: allocating at least one additional memory slot to the requestor based on the requested number of memory cells.

In Example 4, the subject matter of any one of Examples 1-3 optionally comprises determining an allocated number of memory slots for the particular class is less than the second threshold for the class; and based on determining the allocated number of memory slots for the particular class is less than the second threshold corresponding to the class, pre-allocating an additional memory slot for the particular class after granting the memory slot allocation request.

In Example 5, the subject matter of any one of Examples 1-4 optionally comprises determining whether to grant the memory allocation request based whether the requested number of memory slots is available.

In Example 6, the determining that allocation of the requested number of memory slots to the requestor results in satisfaction of the resource allocation constraints of any one of Examples 1-5 optionally comprises: determining whether allocation of the requested number of memory slots to the requestor results in satisfaction of first thresholds for the remaining classes in the plurality of classes.

In Example 7, the subject matter of any one of the Examples 1-6 optionally comprises determining whether allocation of the requested number of memory slots to the requestor results in satisfaction of first thresholds for the remaining classes in the plurality of classes.

In Example 8, the determining whether allocation of the requested number of memory slots to the requestor results in satisfaction of the first thresholds for the remaining classes in the plurality of classes of any one of Examples 1-7 comprises: determining whether a remaining number of available memory slots after allocation of the requested number of memory slots to the requestor is greater than or equal to a sum of first thresholds of all remaining classes.

In Example 9, the memory slot allocation request is a first memory slot allocation request; the requestor is a first requestor; the resource allocation constraints are initial resource allocation constraints; and the subject matter of any one of Examples 1-8 optionally comprises: receiving a second memory slot allocation request from a second requestor; accessing updated resource allocation constraints, the updated resource allocation constraints including a modification to at least one of the initial resource allocation constraints based on detecting a triggering event; and determining whether to grant the second memory slot allocation request based on the updated resource allocation constraints.

In Example 10, the triggering event of Example 9 optionally comprises at least one of an external input, a change to operation mode, a change to system configuration, or a change in traffic profiles.

In Example 11, the modification to at least one of the initial resource allocation constraints of any one of Example 9 and 10 optionally comprises at least one of: an increase or decrease to one or more second thresholds; or an increase or decrease to one or more first thresholds.

Example 12 is a method comprising: accessing, from a configuration register, resource allocation constraints for a plurality of classes, the resource allocation constraints including a first threshold and a second threshold for each class of the plurality of classes, each first threshold defining a minimum number of memory slots to be made available for allocation to a class of the plurality of classes, each second threshold defining a maximum number of memory slots to be allocated to the class of the plurality of classes; receiving, from a requestor assigned to a particular class, a memory slot allocation request, the memory slot allocation request specifying a requested number of memory slots for allocation to the requestor; determining that allocation of the requested number of memory slots to the requestor results in satisfaction of the resource allocation constraints for the plurality of classes; and granting the memory slot allocation request based on determining that allocation of the requested number of memory slots to the requestor results in satisfaction of the resource allocation constraints of the plurality of classes, the granting of the memory slot allocation request including allocating, from at least one memory component of the plurality of memory components, the requested number of memory slots to the requestor.

In Example 13, the subject matter of Example 12 optionally comprises: pre-allocating a memory slot for the particular class prior to receiving the memory slot allocation request; and the granting of the memory slot allocation request includes granting the pre-allocated memory slot to the requestor.

In Example 14, the subject matter of any one of Examples 12 and 13 optionally comprises determining an allocated number of memory slots for the particular class is less than the second threshold for the class; and based on determining the allocated number of memory slots for the particular class is less than the second threshold corresponding to the class, pre-allocating an additional memory slot far the particular class after granting the memory slot allocation request.

In Example 15, the subject matter of any one of Examples 12-14 optionally comprises determining whether allocation of the requested number of memory slots to the requestor results in the particular class having an allocated number of memory slots that exceeds the second threshold for the particular class.

In Example 16, the subject matter of any one of Examples 12-15 optionally comprises determining whether a remaining number of available memory slots after allocation of the requested number of memory slots to the requestor is greater than or equal to a sum of first thresholds of all remaining classes.

In Example 17, the subject matter of any one of Examples 12-16 optionally comprises detecting a triggering event; and in response to detecting the triggering event, dynamically modifying one or more resource allocation constraints to generate updated resource allocation constraints.

In Example 18, the subject matter of any one of Examples 12-17 optionally comprises increasing or decreasing one or more second thresholds; or increasing or decreasing one or more first thresholds.

In Example 19, the memory slot allocation request is a first memory slot allocation request; the requestor is a first requestor; and the subject matter of any one of Examples 12-18 optionally comprises receiving a second memory slot allocation request from a second requestor; and determining whether to grant the second memory slot allocation request based the updated resource allocation constraints.

Example 20 is non-transitory computer-readable storage medium comprising instructions that, when executed by a processing device, cause the processing device to perform operations comprising: accessing, from a configuration register, resource allocation constraints for a plurality of classes, the resource allocation constraints including a first threshold and a second threshold for each class of the plurality of classes, each minimum threshold defining a minimum number of memory slots to be made available for allocation to a class of the plurality of classes, each second threshold defining a maximum number of memory slots to be allocated to the class of the plurality of classes; pre-allocating a memory slot for a particular class; receiving, from a requestor assigned to the particular class, a memory slot allocation request, the memory slot allocation request specifying a requested number of memory slots for allocation to the requestor; determining that allocation of the requested number of memory slots to the requestor results in satisfaction of the resource allocation constraints for the plurality of classes; and granting the memory slot allocation request based on determining that allocation of the requested number of memory slots to the requestor results in satisfaction of the resource allocation constraints of the plurality of classes, the granting of the memory slot allocation request including granting the pre-allocated memory slot to the requestor.

What is claimed is:

1. A system comprising:
   a plurality of memory components partitioned into memory slots:
   a configuration register to store resource allocation constraints for a plurality of classes, the resource allocation constraints including a first threshold and a second threshold for each class of the plurality of classes, each first threshold defining a minimum number of the memory slots to be made available for allocation to a class of the plurality of classes, each second threshold defining a maximum number of memory slots to be allocated to the class; and
   a processing device, operatively coupled with the plurality of memory components, to perform operations comprising:
   receiving, from a requestor assigned to a particular class, a memory slot allocation request, the memory slot allocation request specifying a requested number of memory slots for allocation to the requestor;
   determining that allocation of the requested number of memory slots to the requestor results in satisfaction of the resource allocation constraints for the plurality of classes, the determining that allocation of the requested number of memory slots to the requestor results in satisfaction of the resource allocation constraints comprises determining whether allocation of the requested number of memory slots to the requestor results in satisfaction of first thresholds for remaining classes in the plurality of classes; and
   granting the memory slot allocation request based on determining that allocation of the requested number of memory slots to the requestor results in satisfaction of the resource allocation constraints of the plurality of classes, the granting of the memory slot allocation request including allocating, from at least one memory component of the plurality of memory components, the requested number of memory slots to the requestor.

2. The system of claim 1, wherein:
   the processing device is further to pre-allocate a memory slot for the particular class prior to receiving the memory slot allocation request; and
   the granting of the memory slot allocation request comprises granting the pre-allocated memory slot to the requestor.

3. The system of claim 2, wherein the granting the memory slot allocation request further comprises:
   allocating at least one additional memory slot to the requestor based on the requested number of memory slots.

4. The system of claim 2, wherein the processing device performs further operations comprising:
   determining an allocated number of memory slots for the particular class is less than the second threshold for the class; and
   based on determining the allocated number of memory slots for the particular class is less than the second threshold corresponding to the class, pre-allocating an additional memory slot for the particular class after granting the memory slot allocation request.

5. The system of claim 1, wherein:
   the processing device is further to determine whether to grant the memory allocation request based whether the requested number of memory slots is available.

6. The system of claim 1, wherein the determining that the allocation of the requested number of memory slots to the requestor results in satisfaction of the resource allocation constraints comprises:
   determining whether allocation of the requested number of memory slots to the requestor results in the particular class having an allocated number of memory slots that exceeds the second threshold for the particular class.

7. The system of claim 1, wherein determining whether allocation of the requested number of memory slots to the requestor results in satisfaction of the first thresholds for the remaining classes in the plurality of classes comprises:

determining whether a remaining number of available memory slots after allocation of the requested number of memory slots to the requestor is greater than or equal to a sum of first thresholds of all remaining classes.

8. The system of claim 1, wherein:
the memory slot allocation request is a first memory slot allocation request;
the requestor is a first requestor;
the resource allocation constraints are initial resource allocation constraints;
the processing device is to perform further operations comprising:
receiving a second memory slot allocation request from a second requestor;
accessing updated resource allocation constraints, the updated resource allocation constraints including a modification to at least one of the initial resource allocation constraints based on detecting a triggering event; and
determining whether to grant the second memory slot allocation request based on the updated resource allocation constraints.

9. The system of claim 8, wherein the triggering event comprises at least one of an external input, a change to operation mode, a change to system configuration, or a change in traffic profiles.

10. The system of claim 8, wherein the modification to at least one of the initial resource allocation constraints comprises at least one of:
an increase or decrease to one or more second thresholds; or
an increase or decrease to one or more first thresholds.

11. A method comprising:
accessing, from a configuration register, resource allocation constraints for a plurality of classes, the resource allocation constraints including a first threshold and a second threshold for each class of the plurality of classes, each first threshold defining a minimum number of memory slots to be made available for allocation to a class of the plurality of classes, each second threshold defining a maximum number of memory slots to be allocated to the class of the plurality of classes;
receiving, from a requestor assigned to a particular class, a memory slot allocation request, the memory slot allocation request specifying a requested number of memory slots for allocation to the requestor;
determining that allocation of the requested number of memory slots to the requestor results in satisfaction of the resource allocation constraints for the plurality of classes, the determining that allocation of the requested number of memory slots to the requestor results in satisfaction of the resource allocation constraints comprises determining whether allocation of the requested number of memory slots to the requestor results in satisfaction of first thresholds for remaining classes in the plurality of classes; and
granting the memory slot allocation request based on determining that allocation of the requested number of memory slots to the requestor results in satisfaction of the resource allocation constraints of the plurality of classes, the granting of the memory slot allocation request including allocating, from at least one memory component of the plurality of memory components, the requested number of memory slots to the requestor.

12. The method of claim 11, further comprising:
pre-allocating a memory slot for the particular class prior to receiving the memory slot allocation request; and
the granting of the memory slot allocation request includes granting the pre-allocated memory slot to the requestor.

13. The method of claim 11, further comprising:
determining an allocated number of memory slots for the particular class is less than the second threshold for the class; and
based on determining the allocated number of memory slots for the particular class is less than the second threshold corresponding to the class, pre-allocating an additional memory slot for the particular class after granting the memory slot allocation request.

14. The method of claim 11, wherein the determining that the allocation of the requested number of memory slots to the requestor results in satisfaction of the resource allocation constraints comprises:
determining whether allocation of the requested number of memory slots to the requestor results in the particular class having an allocated number of memory slots that exceeds the second threshold for the particular class.

15. The method of claim 11, wherein the determining that allocation of the requested number of memory slots to the requestor results in satisfaction of the resource allocation constraints comprises:
determining whether a remaining number of available memory slots after allocation of the requested number of memory slots to the requestor is greater than or equal to a sum of first thresholds of all remaining classes.

16. The method of claim 11, further comprising:
detecting a triggering event; and
in response to detecting the triggering event, dynamically modifying one or more resource allocation constraints to generate updated resource allocation constraints.

17. The method of claim 16, wherein the modifying of the one or more resource allocation constraints includes at least one of:
increasing or decreasing one or more second thresholds; or
increasing or decreasing one or more first thresholds.

18. The method of claim 16, wherein:
the memory slot allocation request is a first memory slot allocation request;
the requestor is a first requestor;
the method further comprises:
receiving a second memory slot allocation request from a second requestor; and
determining whether to grant the second memory slot allocation request based the updated resource allocation constraints.

19. A non-transitory computer-readable storage medium comprising instructions that, when executed by a processing device, cause the processing device to perform operations comprising:
accessing, from a configuration register, resource allocation constraints for a plurality of classes, the resource allocation constraints including a first threshold and a second threshold for each class of the plurality of classes, each minimum threshold defining a minimum number of memory slots to be made available for allocation to a class of the plurality of classes, each second threshold defining a maximum number of memory slots to be allocated to the class of the plurality of classes;
pre-allocating a memory slot for a particular class;
receiving, from a requestor assigned to the particular class, a memory slot allocation request, the memory slot allocation request specifying a requested number of memory slots for allocation to the requestor;

determining that allocation of the requested number of memory slots to the requestor results in satisfaction of the resource allocation constraints for the plurality of classes, the determining that allocation of the requested number of memory slots to the requestor results in satisfaction of the resource allocation constraints comprises determining whether allocation of the requested number of memory slots to the requestor results in satisfaction of first thresholds for remaining classes in the plurality of classes; and granting the memory slot allocation request based on determining that allocation of the requested number of memory slots to the requestor results in satisfaction of the resource allocation constraints of the plurality of classes, the granting of the memory slot allocation request including granting the pre-allocated memory slot to the requestor.

20. The non-transitory computer-readable storage medium of claim 19, wherein:

the memory slot allocation request is a first memory slot allocation request;

the requestor is a first requestor;

the resource allocation constraints are initial resource allocation constraints;

the processing device is to perform further operations comprising:

receiving a second memory slot allocation request from a second requestor;

accessing updated resource allocation constraints, the updated resource allocation constraints including a modification to at least one of the initial resource allocation constraints based on detecting a triggering event; and determining whether to grant the second memory slot allocation request based on the updated resource allocation constraints.

\* \* \* \* \*